United States Patent
Landry et al.

(10) Patent No.: US 8,387,393 B2
(45) Date of Patent: Mar. 5, 2013

(54) FLASHBACK RESISTANT FUEL INJECTION SYSTEM

(75) Inventors: Kyle L. Landry, Winter Park, FL (US); Reinhard Schilp, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 925 days.

(21) Appl. No.: 12/489,775

(22) Filed: Jun. 23, 2009

(65) Prior Publication Data

US 2010/0319350 A1 Dec. 23, 2010

(51) Int. Cl.
*F02C 1/00* (2006.01)
*F02G 3/00* (2006.01)

(52) U.S. Cl. ............... 60/748; 60/740; 60/746; 60/737

(58) Field of Classification Search .............. 60/740, 60/746, 747, 742, 737, 748; 239/399
See application file for complete search history.

(56) References Cited

U.S. PATENT DOCUMENTS

| | | | |
|---|---|---|---|
| 5,235,814 A | 8/1993 | Leonard | |
| 5,295,352 A | 3/1994 | Beebe et al. | |
| 5,865,024 A * | 2/1999 | Kress et al. | 60/39.463 |
| 5,943,866 A | 8/1999 | Lovett et al. | |
| 6,038,861 A | 3/2000 | Amos et al. | |
| 6,038,864 A | 3/2000 | Prade et al. | |
| 6,068,467 A | 5/2000 | Mandai et al. | |
| 6,082,111 A | 7/2000 | Stokes | |
| 6,141,967 A * | 11/2000 | Angel et al. | 60/737 |
| 6,164,055 A | 12/2000 | Lovett et al. | |
| 6,247,317 B1 | 6/2001 | Kostka | |
| 6,381,964 B1 * | 5/2002 | Pritchard et al. | 60/746 |
| 6,415,594 B1 | 7/2002 | Durbin et al. | |
| 6,418,726 B1 * | 7/2002 | Foust et al. | 60/776 |
| 6,453,660 B1 * | 9/2002 | Johnson et al. | 60/39.821 |
| 6,705,087 B1 | 3/2004 | Ohri et al. | |
| 6,742,338 B2 | 6/2004 | Tanaka et al. | |
| 6,786,047 B2 | 9/2004 | Bland et al. | |
| 6,848,260 B2 | 2/2005 | North et al. | |
| 6,865,889 B2 * | 3/2005 | Mancini et al. | 60/737 |
| 6,925,809 B2 | 8/2005 | Mowill | |
| 6,931,853 B2 | 8/2005 | Dawson | |
| 7,013,648 B2 | 3/2006 | Griffin et al. | |
| 7,080,515 B2 | 7/2006 | Wasif et al. | |
| 7,174,717 B2 | 2/2007 | Prociw | |
| 7,316,117 B2 | 1/2008 | Ohri | |
| 7,370,466 B2 | 5/2008 | Cai | |
| 7,434,401 B2 * | 10/2008 | Hayashi | 60/743 |

(Continued)

OTHER PUBLICATIONS

Walter R. Laster and Domenico Gambacorta, Flashback Resistant Pre-Mixer Assembly, USPTO U.S. Appl. No. 12/210,354, filed Sep. 15, 2008, 24 pages.

*Primary Examiner* — William H Rodriguez

(57) ABSTRACT

A fuel injector assembly includes a fuel injector that provides fuel to be mixed with air for ignition in a combustor. The fuel injector assembly includes a fuel shroud and a plurality of spanning members. The spanning members are spaced circumferentially on the fuel shroud between the fuel shroud and a base plate assembly, which supports the fuel injector assembly within the combustor. The spanning members space the fuel shroud from the base plate assembly such that an annular gap is formed therebetween. The gap permits a flow of purge air therethrough to be mixed with compressed air entering the fuel shroud and with fuel provided by the fuel injector. The spanning members comprise elongate members having upstream ends that are circumferentially offset from opposed downstream ends so that the spanning members provide tangential velocity to the purge air flowing through the annular gap.

20 Claims, 4 Drawing Sheets

U.S. PATENT DOCUMENTS

| | | | |
|---|---|---|---|
| 7,878,000 B2 * | 2/2011 | Mancini et al. | 60/740 |
| 7,878,001 B2 * | 2/2011 | Ishizaka et al. | 60/748 |
| 7,921,650 B2 * | 4/2011 | Oda et al. | 60/748 |
| 7,926,282 B2 * | 4/2011 | Chew et al. | 60/748 |
| 8,171,735 B2 * | 5/2012 | Mancini et al. | 60/748 |
| 2001/0052229 A1 | 12/2001 | Tuthill et al. | |
| 2002/0014078 A1 | 2/2002 | Mandai et al. | |
| 2006/0174625 A1 | 8/2006 | Ohri | |
| 2007/0101727 A1 | 5/2007 | Prociw | |

\* cited by examiner

FLASHBACK RESISTANT FUEL INJECTION SYSTEM

FIELD OF THE INVENTION

The present invention relates to a combustor in a gas turbine engine, and more particularly, to a combustor including a flashback resistant fuel injector system.

BACKGROUND OF THE INVENTION

In gas turbine engines, compressed air discharged from a compressor section and fuel introduced from an external source are mixed together and burned in a combustors of a combustion section. The mixture is directed through a turbine section, where the mixture expands to provide rotation of a turbine rotor. The turbine rotor may be linked to an electric generator, wherein the rotation of the turbine rotor can be used to produce electricity in the generator.

Gas turbine engines are known to produce an exhaust stream containing a number of combustion products. Many of these byproducts of the combustion process are considered atmospheric pollutants, and increasingly stringent regulations have been imposed on the operation of gas turbine power plants in an effort to minimize the production of these gasses. Of particular concern is the regulation of the production of the various forms of nitrogen oxides collectively known as $NO_x$. It is known that $NO_x$ emissions from a gas turbine increase significantly as the combustion temperature rises. One method of limiting the production of $NO_x$ is the use of a lean mixture of fuel and combustion air, i.e. a relatively low fuel-to-air ratio, thereby limiting the peak combustion temperature to a level below the threshold for $NO_x$ production. However, higher combustion temperatures are desirable to obtain higher efficiency and reduced production of carbon monoxide.

Gas turbine engines have been designed to combust a broad range of hydrocarbon fuels, such as natural gas, kerosene, biomass gas, etc, and more recently gas turbines engines have been designed to combust syngas produced from integrated gasification combined cycle applications. The syngas has a much higher flame speed than natural gas and may be more susceptible to flame flashback when applied in a combustion section. Flame flashback in the combustion section of gas turbine engines is undesirable, as it can cause damage to the components in and around the combustors, i.e., the flame may anchor onto the components and may burn through them.

Specifically, flame flashback may be caused when the turbulent burning velocity of the air and fuel mixture exceeds the axial flow velocity in the combustor, especially in low velocity regions. Flame flashback can also occur in recirculation zones that are caused by abrupt changes in the area of the flow path of the air and fuel mixture, such as at an aft end of a swirler assembly of a fuel injection system, which provides an exit for the air and fuel mixture from the fuel injection system into a main combustion chamber.

SUMMARY OF THE INVENTION

In accordance with a first aspect of the present invention, a fuel injector assembly is provided including a fuel supply element that provides fuel to be mixed with air for ignition in a main combustion chamber of a combustor. The fuel injector assembly comprises a fuel shroud and a plurality of spanning members between the fuel shroud and a base plate assembly. The fuel shroud is disposed about the fuel supply element and includes a forward end defining a compressed air inlet and an opposed aft end defining an outlet. The spanning members are spaced circumferentially on a radially outer surface of the fuel shroud and extend between the fuel shroud and the base plate assembly. The base plate assembly supports the fuel shroud and the spanning members within the combustor. The spanning members space the fuel shroud from the base plate assembly such that an annular gap is formed between the radially outer surface of the fuel shroud and the base plate assembly. The gap permits a flow of purge air therethrough to be mixed with compressed air entering the fuel shroud compressed air inlet and with the fuel provided by the fuel supply element. The spanning members comprise elongate members having an upstream end and an opposed downstream end, the upstream end of each the spanning member circumferentially offset from its downstream end so that the spanning members provide tangential velocity to the purge air flowing through the annular gap.

In accordance with a second aspect of the present invention, a fuel injector assembly is provided including a fuel supply element that provides fuel to be mixed with air for ignition in a main combustion chamber of a combustor. The fuel injector assembly comprises a fuel shroud and a plurality of spanning members between the fuel shroud and a base plate assembly. The fuel shroud is disposed about the fuel supply element and includes a forward end defining a compressed air inlet and an opposed aft end defining an outlet. The spanning members space the fuel shroud from the base plate assembly such that a gap is formed between the fuel shroud and the base plate assembly. The gap permits a flow of purge air therethrough to be mixed with compressed air entering the fuel shroud and with the fuel provided by the fuel supply element. The spanning members provide tangential velocity to the purge air flowing through the gap in a direction of rotation about the fuel shroud that is the same as a direction of rotation of the air passing out the outlet end.

In accordance with a third aspect of the present invention, a fuel injector assembly is provided including a fuel supply element that provides fuel to be mixed with air for ignition in a main combustion chamber of a combustor. The fuel injector assembly comprises a fuel shroud and a plurality of spanning members extending between the fuel shroud and a base plate assembly that supports the fuel shroud and the spanning members within the combustor. The fuel shroud comprises a swirler shroud disposed about the fuel supply element and includes a forward end defining a compressed air inlet and an opposed aft end defining an outlet. The swirler shroud includes swirler vanes providing tangential velocity to air entering the compressed air inlet and passing out the outlet end. The spanning members substantially center the fuel shroud within an opening formed in the base plate assembly and space the fuel shroud from the base plate assembly such that a gap is formed between the fuel shroud and the base plate assembly. The gap permits a flow of purge air therethrough to be mixed with compressed air entering the fuel shroud and with the fuel provided by the fuel supply element. The spanning members comprise elongate members having an upstream end and an opposed downstream end, the upstream end of each the spanning member circumferentially offset from its downstream end so that the spanning members provide tangential velocity to the purge air flowing through the annular gap in a direction of rotation about the fuel shroud that is the same as a direction of rotation of the compressed air passing out the swirler shroud outlet end.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
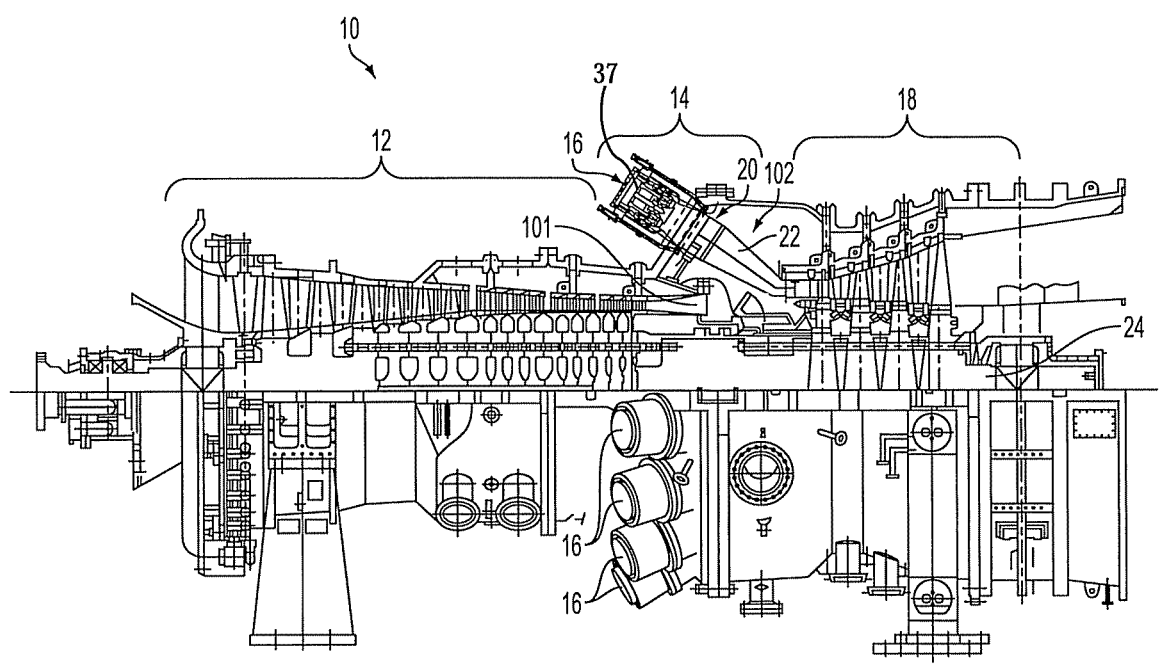
FIG. 1 is a sectional view of a gas turbine engine including a plurality of combustors incorporating fuel injector assemblies according to an embodiment of the invention.

Referring to FIG. 1, a gas turbine engine 10 is shown. The engine 10 includes a compressor section 12, a combustion section 14 including a plurality of combustors 16, and a turbine section 18. The compressor section 12 inducts and pressurizes inlet air which is directed to the combustors 16 in the combustion section 14. Upon entering the combustors 16, the compressed air from the compressor section 12 enters a head end 19 of each of the combustors 16 and is thereafter mixed with a fuel and ignited in a main combustion chamber 14A defined in an inner volume of a liner assembly 20 (see FIG. 2) to produce a high temperature and high velocity combustion gas flowing in a turbulent manner. The combustion gas then flows from the main combustion chamber 14A through a transition 22 to the turbine section 18 where the combustion gas is expanded to provide rotation of a turbine rotor 24.

Figure 2:
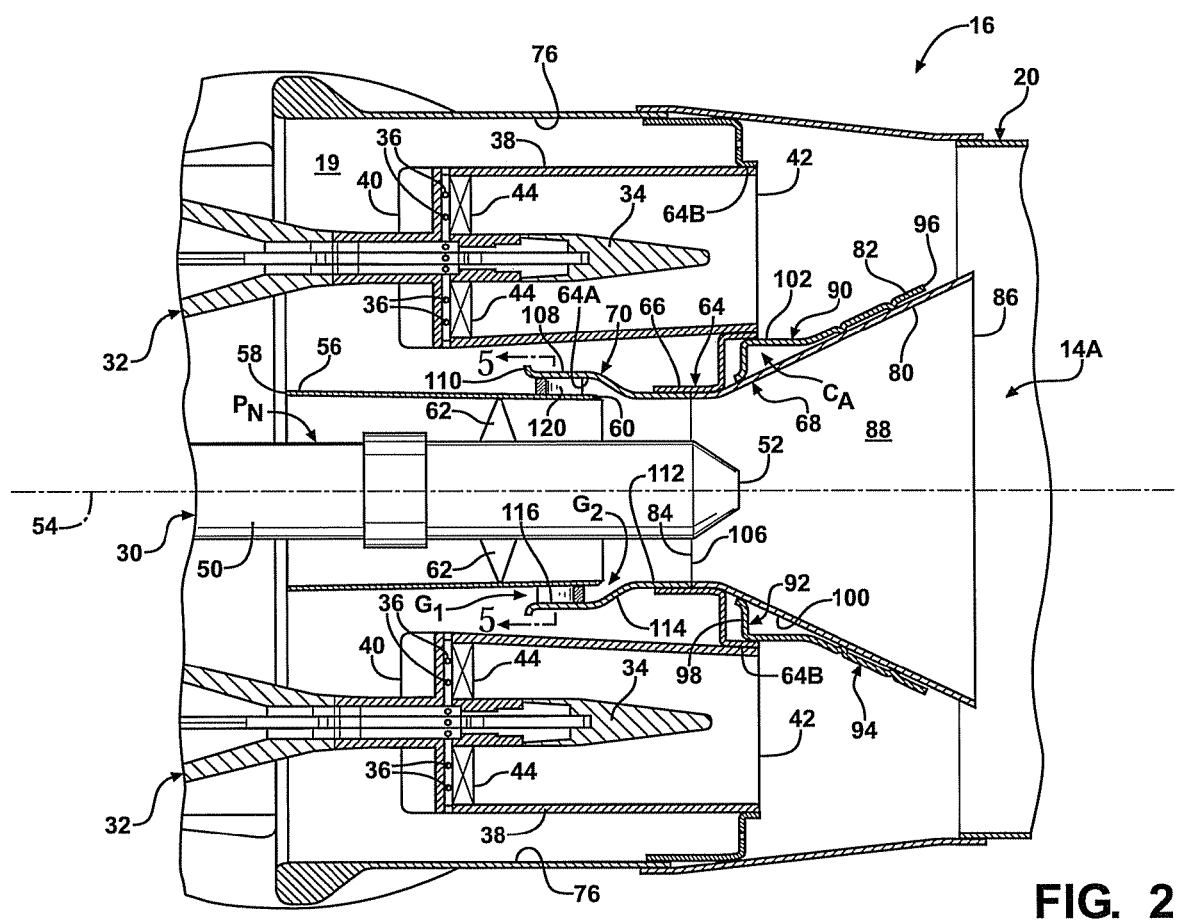
FIG. 2 is a side cross sectional view of a portion of one of the combustors illustrated in FIG. 1.

Referring to FIG. 2, a portion of one of the combustors 16 is shown. It is understood that the remaining combustors 16 are substantially similar to the combustor 16 as described in detail herein. The combustor 16 comprises a pilot fuel injector assembly 30, and a plurality of main fuel injector assemblies 32 extend in an annular array about and are substantially parallel to the pilot fuel injector assembly 30. The main fuel injector assemblies 32 each comprises a main fuel injector 34, also referred to herein as a main fuel supply element, comprising at least one and preferably a plurality of main fuel injection ports 36 as shown in FIG. 2. The main fuel injectors 34 are affixed to and extend from a support housing 37 (see FIG. 1) of the combustor 16. The main fuel injectors 34 are in communication with a source of fuel (not shown) for delivering fuel to the main fuel injection ports 36.

One of the main fuel injector assemblies 32 will now be described. It is noted that the other main fuel injector assemblies 32 are substantially the same as the main fuel injector assembly 32 described herein. The main fuel injector assembly 32 in the embodiment shown comprises a swirler assembly 38, also referred to herein as a main fuel shroud, disposed about the main fuel injector 34 that defines an interior passage for a flow of compressed air from the combustor head end 19 to be mixed with the fuel distributed from the main fuel injection ports 36. It is noted that the swirler assembly 38 may have any suitable shape, such as, for example, cylindrical, oval, or polygonal. The swirler assembly 38 has a forward end 40 and an opposed aft end 42. The forward end 40 defines an air inlet that receives the flow of compressed air from the head end 19 of the combustor 16 and the aft end 42 defines an outlet from the main fuel injector assembly 32 into the main combustion chamber 14A for a mixture comprising the compressed air and the fuel from the main fuel injection ports 36.

The swirler assembly 38 may include one or more swirler vanes 44 that may extend between the main fuel injector 34 and the swirler assembly 38 for providing tangential velocity to the compressed air flowing through swirler assembly 38. The swirler vanes 44 may comprise, for example, angled or curved members that change a direction of the compressed air flowing through the interior passage of the swirler assembly 38 from a generally axial direction to a direction including a component in a circumferential direction in addition to a component in the axial direction. Thus, upon exiting the main fuel injector assembly 32 from the swirler assembly aft end 42, the fuel and air mixture comprises a swirling flow that swirls in a first direction of rotation as it enters the main combustion chamber 14A. It is noted that, the swirling flows of all of the main fuel injector assemblies 32, i.e., the fuel and air mixtures exiting the swirler assembly aft ends 42 of each of the main fuel injector assemblies 32, swirl within the inner volume of the liner assembly 20, e.g., in the first direction of rotation, and are ignited to create the hot combustion gas of the combustor 16.

The pilot fuel injector assembly 30 comprises a pilot nozzle 50, also referred to herein as a fuel supply element, which includes a pilot fuel injection port 52. The pilot nozzle 50 extends substantially axially within the combustor 16 and is disposed along a central axis 54 of the combustor 16. The pilot nozzle 50 is in communication with a source of fuel (not shown) for delivering fuel to pilot fuel injection port 52, which may be the same or a different source of fuel as the source of fuel that provides fuel to the main fuel injectors 34. The pilot fuel injection port 52 distributes fuel into the combustor 16 axially upstream from the main combustion chamber 14A.

The pilot fuel injector assembly 30 in the embodiment shown comprises a substantially cylindrical pilot fuel shroud 56 disposed about a portion $P_N$ of the pilot nozzle 50. The pilot fuel shroud 56 defines an interior passage for a flow of compressed air from the combustor head end 19 to be mixed with the fuel distributed from the pilot fuel injector port 52. It is noted that the pilot fuel shroud 56 may have any suitable shape, such as, for example, oval or polygonal. The pilot fuel shroud 56 has a forward end 58 and an opposed aft end 60. The forward end 58 defines an air inlet that receives the flow of compressed air from the head end 19 of the combustor 16. The aft end 60 is located axially upstream from an axial location of the pilot fuel injection port 52 and defines an outlet for the flow of compressed air that has passed through the pilot fuel shroud 56.

The pilot fuel shroud 56 may be a swirler shroud, i.e., the pilot fuel shroud 56 may include one or more swirler vanes 62 that extend between the pilot nozzle 50 and the pilot fuel shroud 56. The swirler vanes 62 provide an amount of tangential velocity to the compressed air flowing through the interior passage of the pilot fuel shroud 56. The swirler vanes 62 may comprise, for example, angled or curved members that change a direction, i.e., by providing an amount of tangential velocity, of the compressed air flowing through the interior passage of the pilot fuel shroud 56 from a generally axial direction to a direction including a component in the circumferential direction in addition to a component in the axial direction. Thus, upon exiting the pilot fuel shroud 56 from the pilot fuel shroud aft end 60, the air comprises a swirling flow, i.e., in a second direction of rotation, which may be in the opposite direction as the first direction of rotation, as it approaches the pilot fuel injection port 52. It is noted that the second direction of rotation need not be in the opposite direction of rotation as the first direction of rotation, i.e., the first and second directions of rotation may be in the same general direction.

A base plate assembly 64, shown in FIG. 2, comprises a base plate 66, a pilot cone structure 68, and a pilot annulus 70. The base plate assembly 64 defines a substantially centrally formed first aperture or opening 64A therein, see also FIG. 5, for receiving the pilot fuel injector assembly 30. The base plate assembly 64 also includes an annular array of second apertures 64B formed therein for receiving each of the main fuel injector assemblies 32.

The base plate 66 is mounted to the liner assembly 20 of the combustor 16, e.g., by welding, and assists in securing the main fuel injector assemblies 32 in place in the combustor 16. Specifically, as shown in FIG. 2, the swirler assemblies 38 of the main fuel injector assemblies 32 are inserted into the corresponding second apertures 64B of the base plate 66.

Referring to FIG. 2, the pilot cone structure 68 in the embodiment shown comprises an inner cone 80 and an outer cone 82. The inner cone 80 is affixed, i.e., welded, at a forward end 84 thereof (see FIG. 3) to the base plate 66 and, in the embodiment shown, is also affixed to the pilot annulus 70. An aft end 86 of the inner cone 80 defines an outlet of the pilot fuel injector assembly 30 to the main combustion chamber 14A. An inner diameter of the inner cone 80 increases from an axial location adjacent to the forward end 84 of the inner cone 80 to the aft end 86 of the inner cone 80. The inner cone 80 defines a pilot mixing zone 88 where compressed air and purge air are mixed with the fuel from the pilot fuel injection port 52 and ignited to create a pilot flame as will be discussed in detail below.

The outer cone 82 comprises a first portion 90 including a forward end 92 of the outer cone 82 and a second portion 94 that extends from the first portion 92 to an aft end 96 of the outer cone 82. The first portion 90 includes a radially inwardly extending section 98 that abuts a radially outer surface 100 of the inner cone 80. A generally cylindrical section 102 of the first portion 90 extends axially from the radially inwardly extending section 98 to a location where the cylindrical section 102 contacts the radially outer surface 100 of the inner cone 80.

The second portion 94 of the outer cone 82 is spaced from the radially outer surface 100 of the inner cone 80 such that a cooling air channel $C_A$ may be formed between the inner cone 80 and the outer cone, as shown in FIG. 2. A cooling fluid, e.g., compressor air, may flow through the cooling air channel $C_A$ to provide cooling for the inner cone 80. The cooling fluid may enter the cooling fluid channel $C_A$, for example, through apertures (not shown) formed in the base plate 66 and then through apertures (not shown) formed in the radially inwardly extending section 98 of the outer cone 82. While the pilot cone structure 68 in the illustrated embodiment comprises two cones, i.e., an inner cone 80 and an outer cone 82, it is understood that other types of cone structures 68 could be used, such as a cone structure 68 comprising a single cone or more than two cones.

Figure 3:
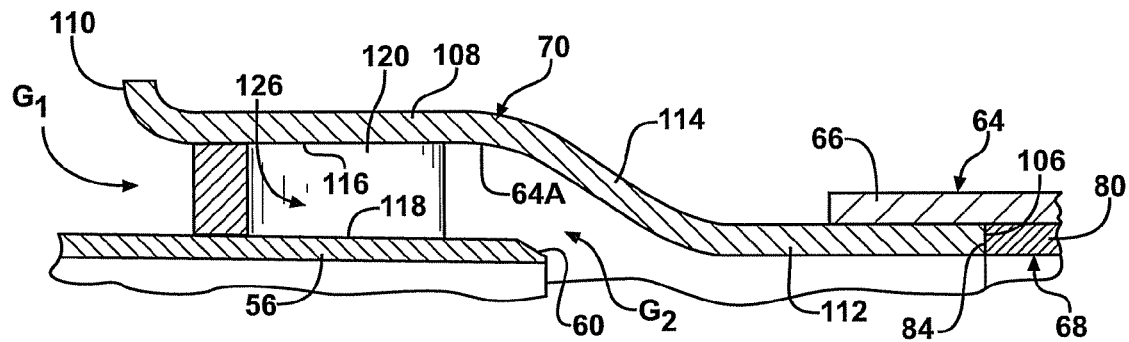
FIG. 3 is an enlarged side cross sectional view of a portion of one of the fuel injector assemblies illustrated in FIG. 2.

Referring additionally to FIG. 3, the pilot annulus 70 is affixed, e.g., welded, to the base plate 66. An aft end 106 of the pilot annulus 70 may abut and may be affixed to the forward end 84 of the inner cone 80, as shown in FIG. 3. The pilot annulus 70 in the embodiment shown comprises a generally cylindrical first section 108 adjacent to a forward end of 110 of the pilot annulus 70, a generally cylindrical second section 112 adjacent to the aft end 106 of the pilot annulus 70, and an intermediate section 114 between the first and second sections 108, 112. The intermediate section 114 may be tapered radially inwardly to define a convergent flow path for a flow of purge air, which purge air will be discussed in greater detail below. While the pilot annulus 70 in the embodiment shown comprises three sections, i.e., the first, second, and third sections 108, 112, 114, it is understood that the pilot annulus 70 may have other configurations without departing from the spirit and scope of the invention. For example, the pilot annulus 70 may comprise a single section having a generally cylindrical shape or a tapered, cone shape.

As shown in FIG. 3, at least a portion of the pilot annulus 70, e.g., the first section 108 and a portion of the intermediate section 114 in the embodiment shown, is disposed about and is radially spaced from the pilot fuel shroud 56 such that an annular first gap $G_1$ (see FIGS. 2, 3, and 5) is formed between a radially inner surface 116 of the pilot annulus 70 and a radially outer surface 118 of the pilot fuel shroud 56. It is noted that other configurations are contemplated, and that other sections 108, 112, 114 of the pilot annulus 70 may be disposed about the pilot fuel shroud 56. For example, only the first section 108 or a portion thereof may be disposed about the pilot fuel shroud 56.

Figure 5:
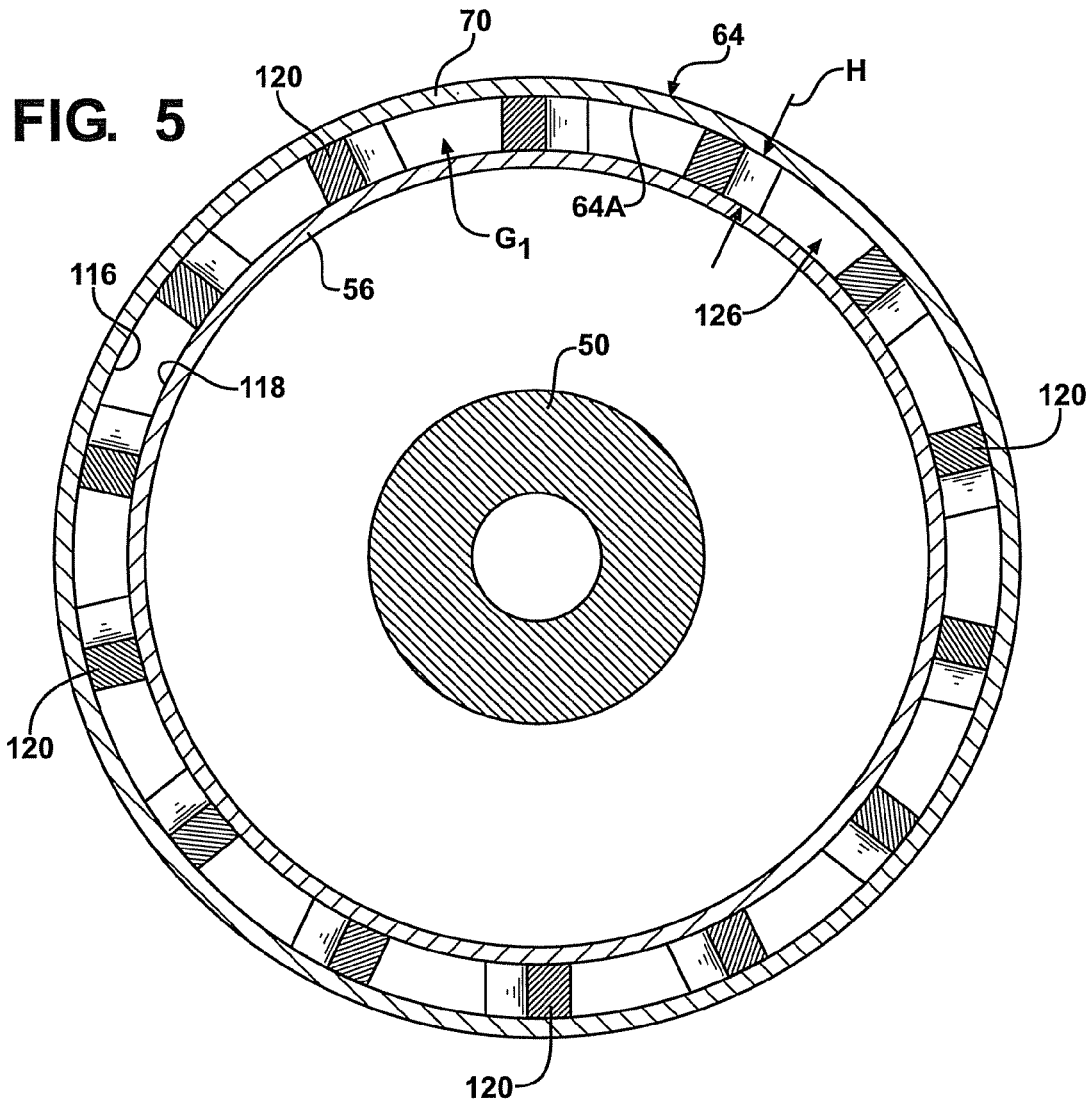
FIG. 5 is a cross sectional view taken along line 5-5 in FIG. 2.

Referring additionally to FIG. 5, a plurality of spanning members 120 extend between the radially inner surface 116 of the pilot annulus 70 and the radially outer surface 118 of the pilot fuel shroud 56. The spanning members 120 may be used to mount the pilot fuel injector assembly 30 to the base plate assembly 64 and serve to retain the pilot fuel injector assembly 30 substantially in the center of the first opening 64A formed in the base plate assembly 64. By centering the pilot fuel injector assembly 30 substantially in the center of the first opening 64A formed in the base plate assembly 64, a substantially even amount of purge air may be provided from all sides of the pilot fuel injector assembly 30, which purge air will be described in greater detail below. The spanning members 120 may be formed integrally with either the pilot fuel shroud 56 or the pilot annulus 70, or may be formed separately therefrom and positioned therebetween.

Figure 4:
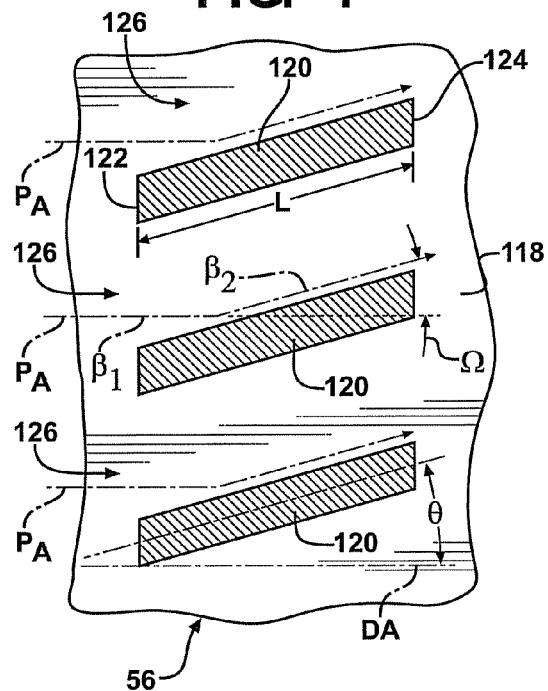
FIG. 4 is a partial view of a fuel shroud including a plurality of spanning members according to an embodiment of the invention.

As illustrated in FIG. 5, each of the spanning members 120 includes a height H in the radial direction of about 5 mm, such that a radial dimension of the first gap $G_1$ is about 5 mm. It is noted that, in a given combustor 16, the height H of the spanning members 120 may vary, but in a preferred embodiment is in a range from about 1 mm to about 10 mm, such that the radial dimension of the first gap $G_1$ is in a range from about 1 mm to about 10 mm. Referring to FIG. 4, a length L of each of the spanning members 120 from an upstream end 122 thereof to a downstream end 124 thereof is about 30 mm, such that a sufficient amount of tangential velocity may be provided to purge air flowing thereby, as will be discussed in greater detail below.

Referring to FIG. 5, in an embodiment, an annular array of spanning members 120 are spaced substantially equally in the circumferential direction on the radially outer surface 118 of the pilot fuel shroud 56. It is noted that the number of spanning members 120 employed in a given combustor 16 may vary, but the number of spanning members 120 in the preferred embodiment is in a range of between about 8 and about 16. Purge air passages 126, shown additionally in FIGS. 3 and 4, are formed between adjacent spanning members 120. The purge air passages 126 allow secondary compressed air from the compressor, referred to herein as purge air $P_A$ (see FIG. 4), to flow therethrough. The purge air $P_A$ is provided to increase the stability of the combustor 16 as will be described in greater detail below.

As shown in FIG. 4, the spanning members 120 are disposed on the radially outer surface 118 of the pilot fuel shroud 56 at an angle $\theta$ relative to an axial direction $D_A$ of the combustor 16, the axial direction $D_A$ of the combustor 16 being substantially parallel to the central axis 54 of the combustor 16. Positioning the spanning members at the angle $\theta$ effects a circumferential offset of the upstream end 122 of each of the spanning members 120 from its downstream end 124. Thus, as the purge air $P_A$ passes through the purge air passages 126, the spanning members 120 provide an amount of tangential velocity to the purge air $P_A$. That is, the spanning members 120 change a direction of the purge air $P_A$ flowing through the purge air passages 126 from a generally axial first direction $\beta_1$ to a second direction $\beta_2$ including a component in the circumferential direction in addition to a component in the axial direction. The second direction $\beta_2$ of the purge air $P_A$ defines an angle $\Omega$ relative to the axial direction $D_A$ of the combustor 16, where the angle $\Omega$ may be substantially equal to the angle $\theta$.

In a preferred embodiment, the angle $\theta$ of the spanning members 120 relative to the axial direction $D_A$ of the combustor 16 is in a range from about 10 degrees to about 70 degrees, and in a most preferred embodiment, the angle $\theta$ of the spanning members 120 relative to the axial direction $D_A$ of the combustor 16 is in a range between about 25 degrees to about 55 degrees. The angle $\theta$ of the spanning members 120 relative to the axial direction $D_A$ of the combustor is chosen to provide a desired amount of tangential velocity to the purge air $P_A$, such that the purge air $P_A$ mixes more efficiently with the compressed air flowing through the pilot fuel shroud 56, which also includes an amount of tangential velocity as discussed above, i.e., provided by the swirler vanes 62. Further, the angle $\theta$ of the spanning members 120 relative to the axial direction $D_A$ Of the combustor is chosen to provide a desired amount of tangential velocity to the purge air $P_A$, such that the purge air $P_A$ mixes more efficiently with the air and fuel mixtures passing out of the main fuel injector assemblies 32, which also include an amount of tangential velocity as discussed above, i.e., provided by the swirler vanes 44.

It is noted that the angle $\theta$ that the spanning members 120 are positioned on the pilot fuel shroud 56 is also selected so as to provide an amount of tangential velocity to the purge air $P_A$ in the second direction of rotation about the pilot fuel shroud 56 that is in the same direction of rotation as the compressed air passing through the pilot fuel shroud 56 and out of the aft end 60 thereof. As noted above, the second direction of rotation of the purge air $P_A$ may be in the opposite direction of rotation as the main fuel injector air and fuel mixtures that are swirling in the inner volume of the liner assembly 20. The selection of the angle $\theta$ in this manner will effect a better mixing of the purge air $P_A$ with the compressed air passing through the pilot fuel shroud 56 and out of the aft end 60 thereof, and is believed to provide an increase in the turbulence of the resulting air and fuel mixture in the main combustion chamber 14A. As noted above, the second direction of rotation need not be in the opposite direction of rotation as the first direction of rotation.

During operation of the engine 10, the compressed air from compressor section 12 flows through a compressor section exit diffuser 101 (see FIG. 1) into a combustor plenum 102 (see FIG. 1). The compressed air then flows into the head end 19 of each of the combustors 16. The compressed air flows from the head ends 19 of the combustors 16 into each of the main fuel injector assemblies 32 through the forward ends 40 of the swirler assemblies 38. The air is mixed with fuel from the main fuel injectors 36 and the air and fuel mixture flows out of the swirler assembly aft ends 42 and into the main combustion chamber 14A. As noted above, the air and fuel mixtures passing out of the main fuel injector assemblies 32 include an amount of tangential velocity in the first direction of rotation, which tangential velocity is provided to the air and fuel mixtures by the swirler vanes 44.

Compressed air also flows through the combustor head end 19 into the pilot fuel injector assembly 30 through the forward end 58 of the pilot fuel shroud 56. The direction of the flow of the compressed air in the pilot fuel shroud 56 is modified by the swirler vanes 62 as the compressed air flows through the interior passage of the pilot fuel shroud 56. Specifically, the swirler vanes 60 provide an amount of tangential velocity to the compressed air in the second direction of rotation as discussed above. The compressed air, which is moving axially downstream and circumferentially in the second direction of rotation, then flows out of the pilot fuel shroud 56 through the aft end 60 thereof and into the pilot mixing zone 88.

Additional compressed air, i.e., the purge air $P_A$, flows from the combustor head end 19 and into the first gap $G_1$ between the pilot annulus 70 and the pilot fuel shroud 56. The purge air flows from the first gap $G_1$ through the purge air passages 126 where an amount of tangential velocity is provided to the purge air by the spanning members 120, as discussed above. The tangential velocity is provided to the purge air $P_A$ such that the purge air rotates in the same direction of rotation, i.e., the second direction of rotation, as the compressed air flowing through the pilot fuel shroud 56. The purge air $P_A$ then passes through a second gap $G_2$ (see FIG. 3) between the aft end 60 of the pilot fuel shroud 56 and the tapered intermediate section 114 of the pilot annulus 70, which tapered intermediate section 114 provides a converging flow path through the second gap $G_2$ for the purge air $P_A$.

The purge air $P_A$ then enters the pilot mixing zone 88 where it is mixed with the compressed air that has passed through the pilot fuel shroud 56. Since the purge air $P_A$ and the compressed air that has passed through the pilot fuel shroud 56 are both rotating in the second direction of rotation, a mixture therebetween is improved over a mixing accomplished in prior art systems that do not include the angled spanning members 120 as disclosed herein. Additionally, the swirling flow of the purge air $P_A$ creates a centrifugal force that propels the purge air $P_A$ towards the inner cone 80. This centrifugal force may reduce the potential for separation of the swirling flow from the diverging surface of the inner cone 80.

The mixture of the purge air $P_A$ and the compressed air that has passed through the pilot fuel shroud 56 is introduced into the pilot mixing zone 88 and rotates within the pilot mixing zone 88 adjacent to the inner surface of the inner cone 80 as the mixture moves axially toward the inner cone aft end 86. The mixture effects an increase in the amount of air adjacent to the inner surface of the inner cone 80, i.e., leans out the fuel and air mixture within the pilot mixing zone 88 adjacent to the inner surface of the inner cone 80. It is believed that this leaning out of the fuel adjacent to the inner surface of the inner cone 80 lowers the resulting mixture of air and fuel below a flammability zone threshold, and, hence, the resulting mixture of air and fuel adjacent to the inner surface of the inner cone 80 is not ignited. Since the mixture of air and fuel is not ignited adjacent to the inner surface of the inner cone 80, flame flashback caused by flames anchoring onto the inner surface of the inner cone 80 is believed to be prevented or reduced.

Further, as the rotating mixture of the purge air $P_A$ with the compressed air that has passed through the pilot fuel shroud 56 exits the pilot fuel injector assembly 30 from the inner cone aft end 86 and enters the main combustion chamber 14A, the rotating mixture mixes with the main fuel injector air and fuel mixtures from the main fuel injector assemblies 32 that are swirling in the inner volume of the liner assembly 20. Since the main fuel injector air and fuel mixtures are rotating in the first direction of rotation and the mixture from the pilot fuel injector assembly 30 is rotating in the second direction of rotation, a resulting turbulent interaction between the mixtures is believed to be enhanced, i.e., over prior art assemblies that do not include the angled spanning members 120 that provide an amount of tangential velocity to the purge air $P_A$ as disclosed herein.

The enhanced turbulent interaction between the mixtures passing out of the respective pilot and main fuel injection assemblies 30, 32 provides for a more turbulent interaction of the air and fuel mixtures with the pilot flame, which pilot flame serves to ignite the air and fuel mixtures within the main combustion chamber 14A to create the hot combustion gas of the combustor 16. That is, since the air and fuel mixtures are interacting in a more turbulent manner, consistent and stable ignitions of the air and fuel mixtures are believed to be achieved.

The increased interaction between the air and fuel mixtures with the pilot flame allows for a lesser amount of fuel to be introduced by the pilot fuel injector assembly 30 while substantially maintaining temperatures of the combustion gas created by the combustor 16. Reducing the amount of fuel introduced by the pilot fuel injector assembly 30 effectively reduces the temperature within the pilot mixing zone 88, i.e., since there is less fuel that is ignited in the pilot mixing zone 88, which reduces the production of $NO_x$ within the combustor 16.

Figure 6:
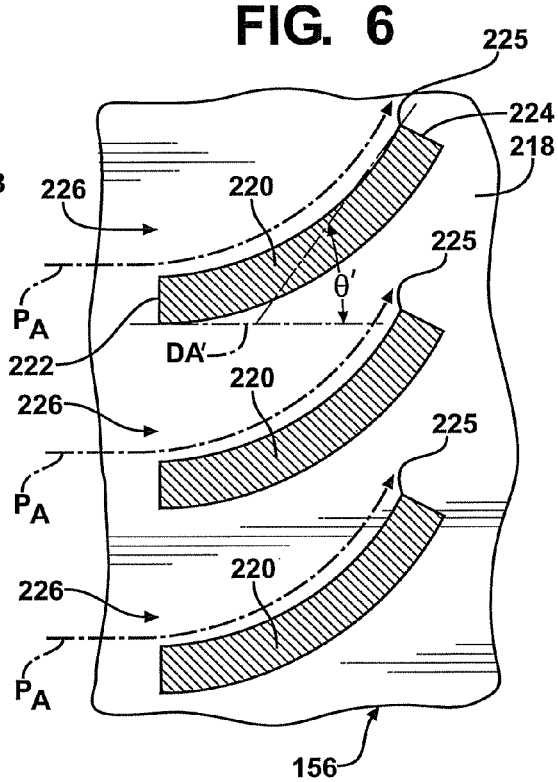
FIG. 6 is a partial view of a fuel shroud including a plurality of spanning members according to another embodiment of the invention.

Referring now to FIG. 6, a plurality of spanning members 220 according to another embodiment of the invention are shown, wherein elements corresponding to elements with reference to the first described embodiment (FIGS. 1-5) are identified by the same reference numeral increased by 100. The spanning members 220 are disposed on a radially outer surface 218 of a pilot fuel shroud 156 between the pilot fuel shroud 156 and a pilot annulus (not shown in this embodiment) of a base plate assembly (not shown in this embodiment).

In this embodiment, the spanning members 220 are curved members having a curvature in an axial direction between an upstream end 222 thereof and a downstream end 224 thereof. In this embodiment, the curvature comprises an angle θ' relative to an axial direction $D_A'$. The angle θ' is defined as a tangent to an aftmost location 225 of a concave side of each spanning members 220, and the axial direction $D_A'$ is substantially parallel to a combustor central axis (not shown in this embodiment). In a preferred embodiment, the angle θ' is in a range from about 10 degrees to about 70 degrees, and in a most preferred embodiment the angle θ' is in a range between about 25 degrees to about 55 degrees. The curvature provides an amount of tangential velocity to purge air $P_A$ flowing through purge air passages 226 formed between adjacent spanning members 220. The tangential velocity of the purge air $P_A$ creates a better mix with compressed air flowing through the pilot fuel shroud 156 and with air and fuel mixtures from main fuel injector assemblies (not shown in this embodiment) as discussed above.

The remaining structure and use thereof is substantially the same as for the embodiment described above for FIGS. 1-5.

Figure 7:
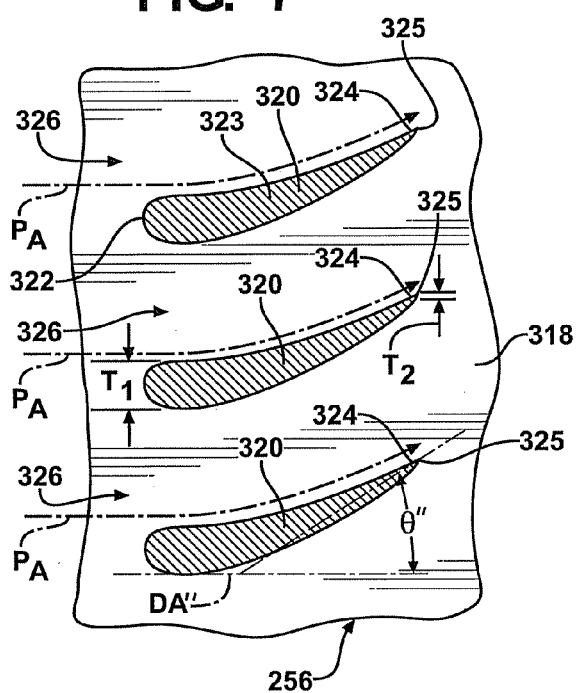
FIG. 7 is a partial view of a fuel shroud including a plurality of spanning members according to another embodiment of the invention.

Referring to FIG. 7, a plurality of spanning members 320 according to another embodiment of the invention are shown, wherein elements corresponding to elements with reference to the first described embodiment (FIGS. 1-5) are identified by the same reference numeral increased by 200. The spanning members 320 are disposed on a radially outer surface 318 of a pilot fuel shroud 256 between the pilot fuel shroud 256 and a pilot annulus (not shown in this embodiment) of a base plate assembly (not shown in this embodiment).

In this embodiment, the spanning members 320 are airfoil-shaped members having an upstream end 322 that comprises a leading edge and a downstream end 324 that comprises a trailing edge. As shown in FIG. 7, the leading edge has a thickness $T_1$ that is greater than a thickness $T_2$ of the trailing edge. Further, the spanning members 320 comprise an intermediate section 323 between the leading and trailing edges thereof. The intermediate section 323 includes a curvature in an axial direction. In this embodiment, the curvature comprises an angle θ" relative to an axial direction $D_A"$. In this embodiment, the curvature comprises an angle θ" relative to an axial direction $D_A"$. The angle θ" is defined as a tangent to an aftmost location 325 of a concave side of each spanning members 320, and the axial direction $D_A"$ is substantially parallel to a combustor central axis (not shown in this embodiment). In a preferred embodiment, the angle θ" is in a range from about 10 degrees to about 70 degrees, and in a most preferred embodiment the angle θ" is in a range between about 25 degrees to about 55 degrees. The curvature provides an amount of tangential velocity to purge air $P_A$ flowing through purge air passages 326 formed between adjacent spanning members 320. The tangential velocity of the purge air $P_A$ creates a better mix with compressed air flowing through the pilot fuel shroud 156 and with air and fuel mixtures from main fuel injector assemblies (not shown in this embodiment) as discussed above.

The remaining structure and use thereof is substantially the same as for the embodiment described above for FIGS. 1-5.

Figure 8:
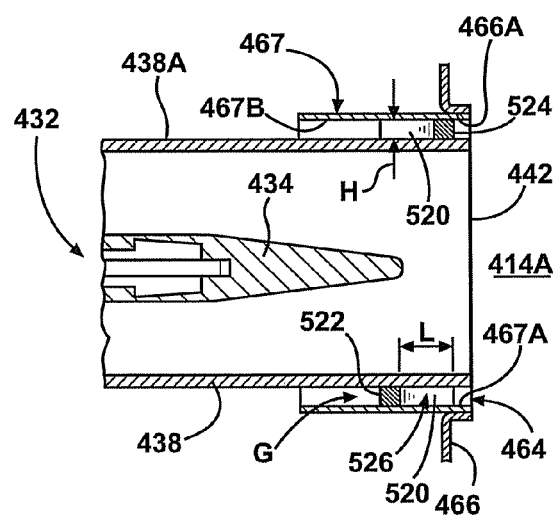
FIG. 8 is a partial view of a main fuel injector assembly according to another embodiment of the invention.

Referring to FIG. 8, a main fuel injector assembly 432 according to another embodiment of the invention in shown, wherein elements corresponding to elements with reference to the first described embodiment (FIGS. 1-5) are identified by the same reference numeral increased by 400. It is noted that, in a given combustor, a plurality of main fuel injector assemblies 432 may be provided about a pilot fuel injector assembly (not shown in this embodiment), as discussed above with reference to FIGS. 1-5.

The main fuel injector assembly 432 according to this embodiment comprises a swirler assembly 438, also referred to herein as a main fuel shroud or a swirler shroud, disposed about a main fuel injector 434, also referred to herein as a main fuel supply element. The swirler assembly 438 defines an interior passage for a flow of compressed air from a combustor head end (not shown in this embodiment) to be mixed with fuel distributed from main fuel injection ports (not shown in this embodiment) of the main fuel injector 434. The swirler assembly 438 has a forward end (not shown in this embodiment) and an opposed aft end 442. The forward end defines an air inlet that receives the flow of compressed air from the combustor head end, and the aft end 442 defines an outlet from the main fuel injector assembly 432 into a main combustion chamber 414A for a mixture comprising the compressed air and the fuel from the main fuel injection ports.

The swirler assembly 438 may include one or more swirler vanes (not shown in this embodiment) as discussed above with reference to FIG. 2. The swirler vanes change a direction of the compressed air flowing through the interior passage of the swirler assembly 438 from a generally axial direction to a direction including a component in a circumferential direction, i.e., in a first direction of rotation, in addition to a component in the axial direction.

A base plate assembly 464 according to this embodiment comprises a base plate 466 and a plurality of main swirler cups 467 (one shown in FIG. 8), wherein a corresponding main swirler cup 467 is provided for each of the main fuel injector assemblies 432. The base plate 466 defines an annular array of apertures 466A (one shown in FIG. 8) formed therein for receiving each of the main swirler cups 467. As shown in FIG. 8, the main swirler cup 467 is affixed, e.g., by welding, within the aperture 466A, and the main swirler cup 467 defines a corresponding opening 467A for receiving its corresponding main fuel injector assembly 432.

As shown in FIG. 8, a plurality of spanning members 520 according to this embodiment extend between a radially outer surface 438A of the swirler assembly 438 and a radially inner surface 467B of the main swirler cup 467. The spanning members 520 may be used to mount the main fuel injector assembly 432 to the base plate assembly 464 and serve to retain the main fuel injector assembly 432 substantially in the center of the opening 467A formed in the main swirler cup 467. By centering the main fuel injector assembly 432 substantially in the center of the opening 467A formed in the main swirler cup 467, a substantially even amount of purge air may be provided from all sides of the main fuel injector assembly 432, which purge air will be described in greater detail below. The spanning members 520 according to this embodiment may be formed integrally with either the swirler shroud 432 or the main swirler cup 467, or may be formed separately therefrom and positioned therebetween.

Each of the spanning members 520 includes a height H in the radial direction of about 5 mm, such that a radial dimension of a gap G formed between the swirler shroud 432 and the main swirler cup 467 is about 5 mm. It is noted that, in a given combustor, the height H of the spanning members 520 may vary, but in a preferred embodiment is in a range from about 1 mm to about 10 mm, such that the radial dimension of the gap G is in a range from about 1 mm to about 10 mm. A length L of each of the spanning members 520 is about 30 mm, such that a sufficient amount of tangential velocity may be provided to purge air flowing thereby, as will be discussed in greater detail below. As with the spanning members 120 discussed above with reference to FIGS. 1-5, the spanning members 520 comprise an upstream end 522 and an opposed downstream end 524, wherein the upstream end 522 of each spanning member 520 is circumferentially offset from its downstream end 524. It is noted that, while the spanning members 520 illustrated in FIG. 8 comprise a similar shape to the spanning members 120 disclosed above with reference to FIGS. 1-5, the spanning members 520 may comprise other suitable shapes, such as the shapes of the spanning members 220, 320 illustrated in FIGS. 6 and 7.

In an embodiment, an annular array of spanning members 520 are spaced substantially equally in the circumferential direction on the radially outer surface 438A of the swirler assembly 438. It is noted that the number of spanning members 520 employed in a given combustor may vary, but the number of spanning members 520 in the preferred embodiment is in a range of between about 8 and about 16. Purge air passages 526 are formed between adjacent spanning members 520. The purge air passages 526 allow secondary compressed air from the compressor, referred to herein as purge air, to flow therethrough.

The remaining structure is substantially the same as for the embodiment described above for FIGS. 1-5. It is noted that the spanning members 520 according to this embodiment could be used in addition to any of the spanning members 120, 220, 320 of the above embodiments, or the spanning members 520 could be used in a combustor without the spanning members 120, 220, 320 of the above embodiments.

During operation, compressed air from a compressor section (not shown in this embodiment) flows through a compressor section exit diffuser (not shown in this embodiment) into a combustor plenum (not shown in this embodiment). The compressed air then flows into the head end of each of the combustors. The compressed air flows from the head ends of the combustors into each of the main fuel injector assemblies 432 through the forward ends of the swirler assemblies 438. The air is mixed with fuel from the main fuel injectors 436 and the air and fuel mixture flows out of the main fuel injector assemblies 432 through the swirler assembly aft ends 442. As noted above, the air and fuel mixtures passing out of the main fuel injector assemblies 432 include an amount of tangential velocity in the first direction of rotation, which tangential velocity is provided to the air and fuel mixtures by the swirler vanes.

Additional compressed air, i.e., the purge air, flows from the combustor head end and into the gaps G between the swirler shrouds 438 and the main swirler cups 467. The purge air flows through the purge air passages 526 where an amount of tangential velocity is provided to the purge air by the spanning members 520. The tangential velocity is provided to the purge air such that the purge air rotates in the same direction of rotation, i.e., the first direction of rotation, as the compressed air flowing through the swirler shrouds 438. The purge air then exits the purge air passages 526 and enters the main combustion chamber 414A, where the purge air mixes with the compressed air exiting the swirler shrouds 438. Since the purge air and the compressed air flowing through the swirler shrouds 438 are both rotating in the first direction of rotation, a mixture therebetween is improved over a mixing accomplished in prior art systems that do not include the angled spanning members 520 as disclosed herein.

The mixtures of the purge air and the compressed air flowing through the swirler shrouds 438 are mixed in the main combustion chamber 414A adjacent to the swirler assembly aft ends 442. The mixtures effect an increase in the amount of air adjacent to the swirler assembly aft ends 442, i.e., leans out the fuel and air mixture adjacent to the swirler assembly aft ends 442. It is believed that this leaning out of the fuel and air mixture adjacent to the swirler assembly aft ends 442 lowers the resulting mixture of air and fuel below a flammability zone threshold, and, hence, the resulting mixture of air and fuel adjacent to the swirler assembly aft ends 442 is not ignited. Since the mixture of air and fuel is not ignited adjacent to the swirler assembly aft ends 442, flame flashback caused by a flame recirculation zone adjacent to the swirler assembly aft ends 442 is believed to be prevented or reduced.

Compressed air also flows through the combustor head end into the pilot fuel injector assembly, as discussed above with reference to FIG. 1-5. As discussed above, a resulting turbulent interaction between the mixtures from the main fuel injector assemblies 432 and the pilot fuel injector assembly is believed to be enhanced, i.e., over prior art assemblies that do not include the angled spanning members 520 (and the spanning members 120 associated with the pilot fuel injector assembly, if employed) that provide an amount of tangential velocity to the purge air, as disclosed herein.

The enhanced turbulent interaction between the mixtures passing out of the respective pilot and main fuel injection assemblies 432 provides for a more turbulent interaction of the air and fuel mixtures with a pilot flame, which pilot flame serves to ignite the air and fuel mixtures within the main combustion chamber 414A to create hot combustion gas of the combustor. That is, since the air and fuel mixtures are interacting in a more turbulent manner, consistent and stable ignitions of the air and fuel mixtures are believed to be achieved.

Other advantages realized by the increased interaction of the mixtures are substantially as set out above with reference to FIGS. 1-5.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A fuel injector assembly including a fuel supply element that provides fuel to be mixed with air for ignition in a main combustion chamber of a combustor, the fuel injector assembly comprising:
   a pilot fuel shroud disposed about the fuel supply element, said pilot fuel shroud including a forward end defining a compressed air inlet and an opposed aft end defining an outlet; and
   a plurality of spanning members spaced circumferentially on a radially outer surface of said pilot fuel shroud and extending between said pilot fuel shroud and a base plate assembly that supports said pilot fuel shroud and said spanning members within the combustor and that comprises a base plate, a pilot annulus, and a cone structure, said spanning members spacing said pilot fuel shroud from said base plate assembly such that an annular gap is formed between said radially outer surface of said pilot fuel shroud and said base plate assembly, said gap permitting a flow of purge air therethrough to be mixed with compressed air entering said pilot fuel shroud compressed air inlet and passing out said pilot fuel shroud outlet, wherein said spanning members comprise elongate members having an upstream end and an opposed downstream end, said upstream end of each said spanning member circumferentially offset from its downstream end so that said spanning members provide tangential velocity to said purge air flowing through said annular gap.

2. The fuel injector assembly according to claim 1, wherein said pilot fuel shroud comprises a swirler shroud having swirler vanes providing tangential velocity to said compressed air entering said compressed air inlet and passing out said outlet.

3. The fuel injector assembly according to claim 2, wherein said spanning members provide said tangential velocity to said purge air in a direction of rotation about said swirler shroud that is the same as a direction of rotation of said compressed air passing out said outlet.

4. The fuel injector assembly according to claim 1, wherein said spanning members extend between said pilot fuel shroud and said pilot annulus.

5. The fuel injector assembly according to claim 1, wherein said spanning members substantially center said pilot fuel shroud within an opening formed in said base plate assembly.

6. The fuel injector assembly according to claim 1, wherein said spanning members extend on said pilot fuel shroud radially outer surface at an angle relative to an axial direction, wherein said angle relative to said axial direction is between about 10 degrees and about 70 degrees.

7. The fuel injector assembly according to claim 6, wherein said angle relative to said axial direction is between about 25 degrees and about 55 degrees.

8. The fuel injector assembly according to claim 1, wherein said spanning members comprise curved members, a curvature thereof in an axial direction between said upstream and downstream ends.

9. The fuel injector assembly according to claim 1, wherein:
   said upstream end is a leading edge having a first thickness and said downstream end is a trailing edge having a second thickness different than said first thickness; and
   an intermediate section of each of said spanning members is located between said leading edge and said trailing edge thereof, said intermediate section comprising a curvature in an axial direction.

10. The fuel injector assembly according to claim 1, wherein a radial height of each of said spanning members is from about 1 mm to about 10 mm.

11. The fuel injector assembly according to claim 1, wherein a length of each of said spanning members from said upstream end to said downstream end is at least about 30 mm.

12. A fuel injector assembly including a fuel supply element that provides fuel to be mixed with air for ignition in a main combustion chamber of a combustor, the fuel injector assembly comprising:
   a fuel shroud disposed about the fuel supply element; and
   a plurality of spanning members extending between said fuel shroud and a base plate assembly that supports said fuel shroud and said spanning members in the combustor, said spanning members spacing said fuel shroud from said base plate assembly such that a gap is formed between said fuel shroud and said base plate assembly, said gap permitting a flow of purge air therethrough to be mixed with compressed air entering and then passing out of said fuel shroud, wherein said spanning members provide tangential velocity to said purge air flowing through said gap in a direction of rotation about said fuel shroud that is the same as a direction of rotation of said air passing out said fuel shroud;
   wherein said fuel shroud comprises one of:
      a pilot fuel shroud, wherein said base plate assembly comprises a base plate, a pilot annulus, and a cone structure; and
      a main fuel injector swirler assembly, wherein said base plate assembly comprises a base plate and a main swirler cup.

13. The fuel injector assembly according to claim 12, wherein said fuel shroud comprises a swirler shroud having swirler vanes providing tangential velocity to said compressed air entering and then passing out of said fuel shroud.

14. The fuel injector assembly according to claim 12, wherein said spanning members substantially center said fuel shroud within an opening formed in said base plate assembly.

15. The fuel injector assembly according to claim 12, wherein said spanning members extend on said fuel shroud radially outer surface at an angle relative to an axial direction, wherein said angle relative to said axial direction is between about 25 degrees and about 55 degrees.

16. The fuel injector assembly according to claim 12, wherein said spanning members comprise curved members, a curvature thereof in an axial direction between said upstream and downstream ends.

17. A fuel injector assembly including a fuel supply element that provides fuel to be mixed with air for ignition in a main combustion chamber of a combustor, the fuel injector assembly comprising:
- a fuel shroud comprising a main fuel injector swirler assembly disposed about the fuel supply element, said fuel shroud including a forward end defining a compressed air inlet and an opposed aft end defining an outlet; and
- a plurality of spanning members spaced circumferentially on a radially outer surface of said fuel shroud and extending between said main fuel injector swirler assembly and a main swirler cup of a base plate assembly that supports said fuel shroud and said spanning members within the combustor and that comprises a base plate and said main swirler cup, said spanning members spacing said fuel shroud from said base plate assembly such that an annular gap is formed between said radially outer surface of said fuel shroud and said base plate assembly, said gap permitting a flow of purge air therethrough to be mixed with compressed air entering said fuel shroud compressed air inlet and passing out said fuel shroud outlet, wherein said spanning members comprise elongate members having an upstream end and an opposed downstream end, said upstream end of each said spanning member circumferentially offset from its downstream end so that said spanning members provide tangential velocity to said purge air flowing through said annular gap.

18. The fuel injector assembly according to claim 17, wherein said spanning members at least one of:
- extend on said fuel shroud radially outer surface at an angle relative to an axial direction, wherein said angle relative to said axial direction is between about 25 degrees and about 55 degrees; and
- comprise curved members, a curvature thereof in an axial direction between said upstream and downstream ends.

19. The fuel injector assembly according to claim 17, wherein said fuel shroud comprises a swirler shroud having swirler vanes providing tangential velocity to said compressed air entering said compressed air inlet and passing out said outlet.

20. The fuel injector assembly according to claim 19, wherein said spanning members provide said tangential velocity to said purge air in a direction of rotation about said swirler shroud that is the same as a direction of rotation of said compressed air passing out said outlet.

* * * * *